Nov. 9, 1965  R. R. GOINS  3,216,629
BLENDING APPARATUS
Filed Jan. 24, 1964  4 Sheets-Sheet 1

INVENTOR.
R.R. GOINS
BY Young & Quigg
ATTORNEYS

Nov. 9, 1965   R. R. GOINS   3,216,629
BLENDING APPARATUS
Filed Jan. 24, 1964   4 Sheets-Sheet 2

INVENTOR.
R.R. GOINS
BY Young & Quigg
ATTORNEYS

Nov. 9, 1965  R. R. GOINS  3,216,629
BLENDING APPARATUS
Filed Jan. 24, 1964  4 Sheets-Sheet 3

INVENTOR.
R. R. GOINS
BY Young & Quigg
ATTORNEYS

Nov. 9, 1965

R. R. GOINS 3,216,629

BLENDING APPARATUS

Filed Jan. 24, 1964

INVENTOR.
R. R. GOINS

BY Young & Quigg

ATTORNEYS

United States Patent Office 3,216,629
Patented Nov. 9, 1965

3,216,629
BLENDING APPARATUS
Robert R. Goins, Bartlesville, Okla., assignor to Phillips Petroleum Company, a corporation of Delaware
Filed Jan. 24, 1964, Ser. No. 339,985
14 Claims. (Cl. 222—459)

This invention relates to the blending or homogenization of flowable particulate solids. In another aspect it relates to improved apparatus for effecting such blending.

Blending is accomplished by a dilution process. In the prior art it is known to homogenize or blend a heterogeneous mass of particulate flowable solids by establishing a bed or mass of such solids, withdrawing material from at least two different elevations in such mass or bed, mixing the withdrawn materials together and conveying the resultant mixture into an upper level in said mass or bed. This type of operation and apparatus is illustrated in U.S. Patent 3,029,986 (1962). The general principle has found application in many types of processes, some of which are chemical processes wherein a product is produced in particulate form over a long period of time and wherein variations in reaction conditions, catalyst activity and purity of charge materials result in relatively minor but detectable variations in the properties of the final product. Thus in the production of thermoplastic materials in a polymerization process wherein the product of the manufacturing plant is in the form of small particles or pellets, some properties of the product vary over a period of time as a result of varying reaction conditions. When the product is stored, for example in a large tank or bin, the properties of the product withdrawn from one level in said tank or bin will be slightly different from the properties of a portion withdrawn from another level. This variation in properties tends to complicate meeting or guaranteeing specifications on the product. This situation can be remedied by mixing and homogenizing the mass of particulate material. Unfortunately, apparatus used in the past for this purpose has been relatively inefficient and the homogenization or blending of the products, particularly in large quantities, e.g. of the order of several hundred thousand pounds, has been unduly costly.

In accordance with this invention, I have now provided solids-blending apparatus of the type described having improved efficiency by providing, in its broadest concept, various baffling means and conduits in a blending tank which establish passageways or conduits from various levels in the tank. In one specific embodiment of the invention, ring and/or cone baffles are provided above the inverted bottom exit cone so as to direct particle flow from one or several centrally located drain tubes and from the sides of the vessel. In another aspect, external conduits are provided in association with vertical drain tubes so as to provide improved blending. As a further embodiment of the invention, a vertically compartmented blender is provided in which the compartments are filled sequentially. In a still further embodiment, a blender is provided in which blending and discharge are caused to be in desired proportions by the compartment cross-sectional discharge areas provided. In a yet further embodiment of the invention, upright drain tubes are provided in which internal baffling means are associated therewith for the purpose of flow control of solid particles.

Accordingly, an object of this invention is to improve the blending of solids, particularly in large quantities. Another object of the invention is to provide improved and economical apparatus for the blending of particulate solids. An additional object of the invention is to increase the efficiency of blending of flowable particulate solid material.

Other objects, advantages and features of the invention will be readily apparent to those skilled in the art from the following description, the drawings and the appended claims.

The drawings illustrate several specific embodiments of the invention:

Figure 9:
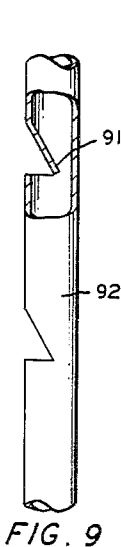
Figure 10:
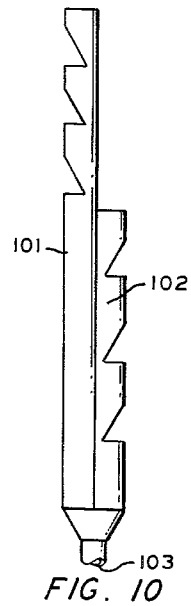
Figure 7:
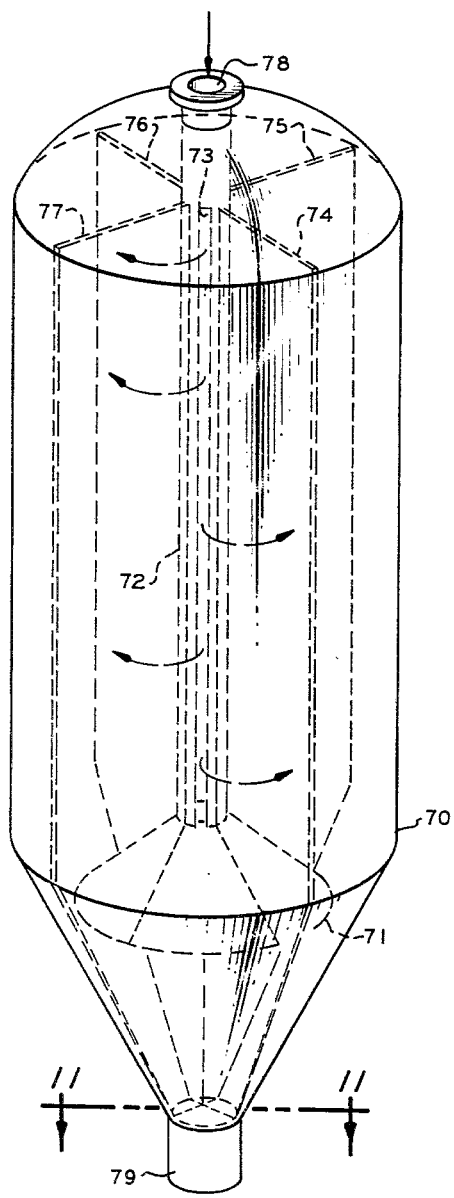
Figure 8:
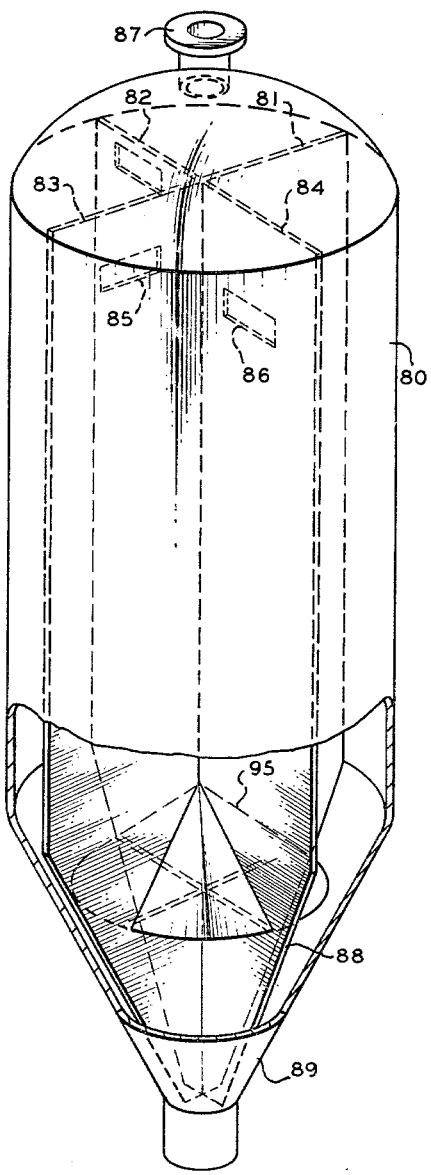
Figure 11:
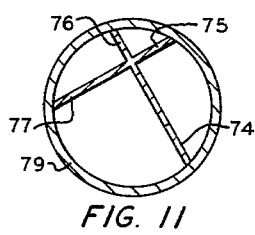

FIGURE 7 discloses a diagrammatic representation of a compartmentalized blender having a slotted central feed conduit therein;

FIGURE 8 is a sectional view of a compartmentalized blender provided with means for sequential filling of the compartments;

FIGURE 9 discloses a baffling device for the upright drain tubes such as disclosed in FIGURES 1, 3, 4, 5 and 6;

FIGURE 10 is a diagrammatic view of an upright drain tube composed of a plurality of conduits therein and a common outlet; and FIGURE 11 represents a cross-sectional view of the blender of FIGURE 7 along the line 11—11.

Broadly, the invention comprises solids blending apparatus consisting of a chamber having an inlet and outlet at substantially opposite ends thereof, a downwardly concave conical baffling means in a lower part of said chamber and spaced from the bottom of said chamber; at least one upright conduit positioned within said chamber to provide a passageway around said baffling means; and at least one opening in each such conduit at a level above said conical baffling means.

The various specific embodiments of the invention will be described in conjunction with a description of the various figures.

Figure 1:
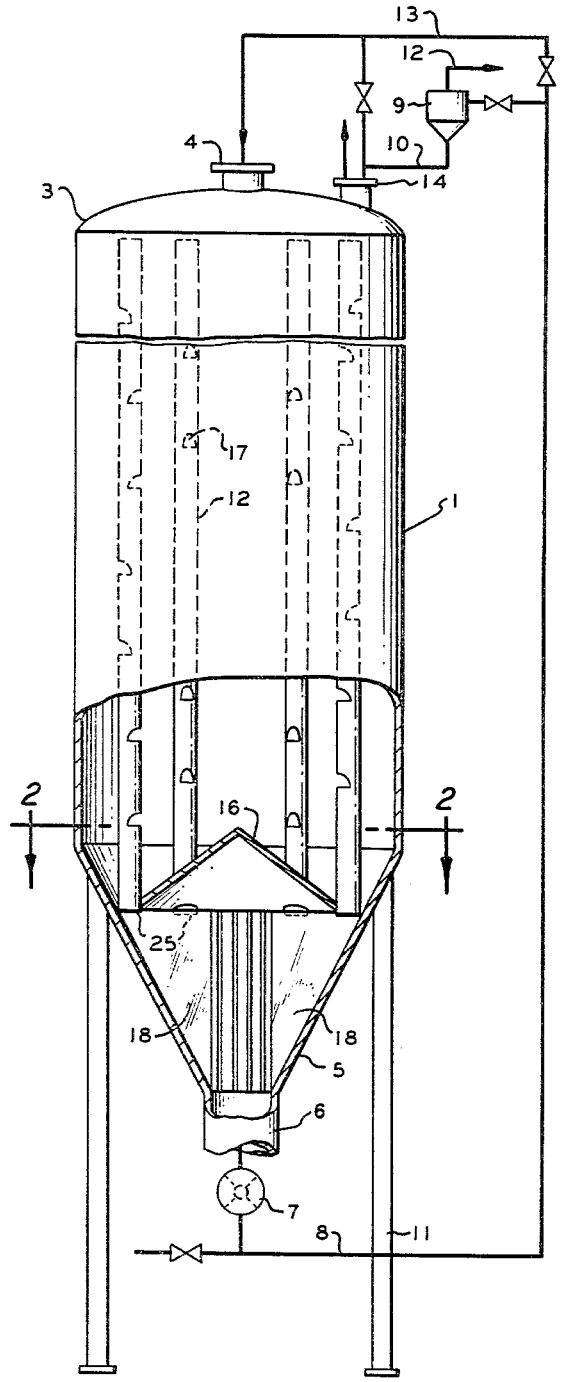
FIGURE 1 is an elevation, partly in section, of a blending apparatus having upright drain tubes and a conical baffling therein.

The apparatus illustrated in FIGURE 1 comprises an upright cylindrical tank 1 having a top closure member 3 with an access opening 4 and a conical bottom 5 provided with an outlet 6 in which is star valve 7. Attached to the outlet 6 is a pneumatic conveyor 8 through which particulate material withdrawn from outlet 6 is pneumatically elevated into cyclone separator 9 and returned through conduit 10 into the upper interior of tank 1. Tank 1 is supported on legs 11. Carrier gas, from a source not shown, is supplied through the inlet of pneumatic conveyor 8 and is withdrawn through outlet 15. Alternatively, cyclone 9 can be bypassed, as by conduit 13, and the solids returned to the upper part of tank 1 through opening 4 and/or 14, the upper tank space acting to separate solids from carrier gas, which can escape through outlet 14. Since pneumatic conveyors are well known in the art, no further detailed illustration of this member is necessary at this point. Where a one-pass system is preferred, the pneumatic system can be omitted and the mixed particles passed directly from outlet 6 to shipping or extruding facilities or to other use.

Within tank 1 is a conical baffle member 16 spaced from tank bottom 5 and inverse to the shape thereof.

Figure 2:
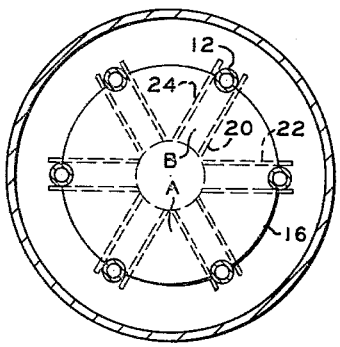
FIGURE 2 is a cross-sectional view of the blender of FIGURE 1 at section 2—2 showing baffling for varying the flow ratios of the particles from various sections of the tank.

Conduits or tube members 12 having holes 17 therein are adapted to the outer periphery of the conical baffle 16. Extending below the area of the conical baffles are baffles 18 which can be so spaced as to regulate the ratio of particles flowing through the tubes or around the conical baffle 16. As shown in FIGURE 2, which is a cross section of tank 2 taken at the point 2–2, particles flowing around the conical baffle 16 will pass through zone A as defined by baffle 20 and 22. As illustrated, baffles 20 and 24 likewise define zone B which confines the particles flowing through openings 25 of the conduits 12 of FIGURE 1. By varying the spacing between adjacent baffles 20 and 22, the ratio of flow through zones A and B is varied.

Figure 3:
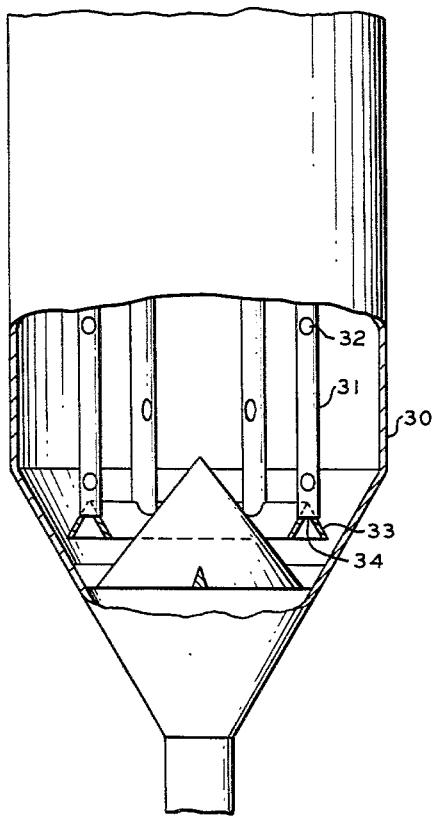
FIGURE 3 is a sectional view of another modification of the blender of FIGURE 1 in which, during operation, the drain tubes are not completely filled.
Figure 4:
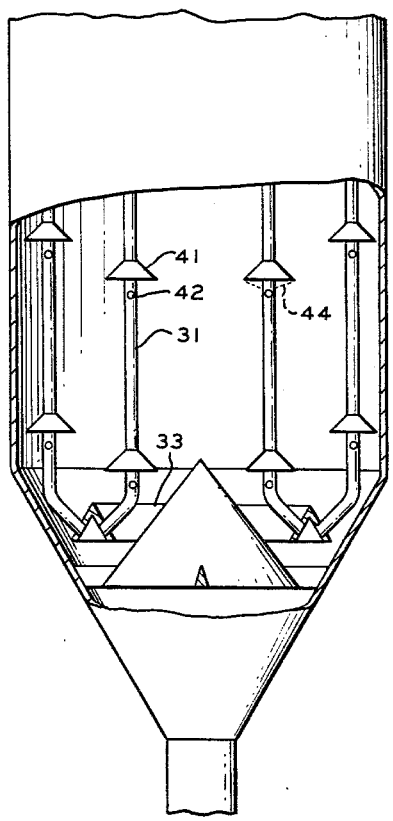
FIGURE 4 is a diagrammatic view showing modification of the drain tubes of FIGURE 3.

Another embodiment of the invention is illustrated by FIGURES 3 and 4 wherein tank 30 has conduits or tube members 31 therein adapted to the upper surface of ring baffle 33. In FIGURE 4, the drain tubes are joined to baffle 33 below its apex and the upright conduits or tubes 31 have openings 42 in their side walls. The portion of the apex of the baffle 33 in FIGURE 3 occupied by conduits 31 is removed so as to allow flow through the ring at point 34. The conduits can be closed at the top and secured to top closure 3 (FIGURE 1) as by welding, and can be further provided with removable caps for inspection and cleaning. However, conduits 31 can be fastened to closure member 3 to abut thereagainst and thus be closed by top closure member 3. Alternatively, these conduits need not extend as far as closure member 3 and can be open at their tops if desired for particle flow purposes. Any number of openings 32 and 42 can be provided in tubes 31 consistent with adequate structural strength and to somewhat restrict free flow of material into said conduits, so that the conduits are not filled with solids during operation.

As shown in FIGURE 4, the conduits 31 of FIGURE 3 can be positioned on the sides of the ring baffle member 33 below the apex thereof. The use of this arrangement allows for an additional ring of tubes or conduits 31 to be present in the tank. Baffle such as 41 can be positioned over each of the openings 42 to aid in directing the flow of particles therethrough. The angle of repose of the solids under baffle 41 is indicated by dotted line 44.

Figure 5:
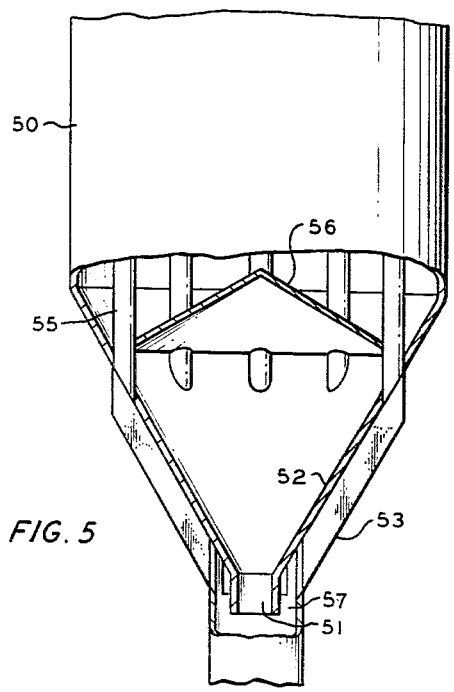
FIGURE 5 illustrates another embodiment of the invention wherein external conduits are provided in conjunction with the upright conduits.

Another embodiment of the invention is illustrated by FIGURE 5 wherein tank 50 is provided with a conical bottom 52. Upright conduits 55 are provided which continue through conical bottom 52. Flow passages such as 53 are so provided by means of an external cone below said conical bottom or external channels in association with each upright conduit 55 as to form an enclosed flow area which serves to conduct the material flowing through conduits 55 to annular zone 57 wherein they rejoin that portion of the material passing through zone 51 from around cone 56. The amount of particles flowing through flow passages 53 relative to that flowing through opening 51 is controlled by the ratio of the area of the annulus 57 to the area of the central flow passage 51. Relative flow rates of particles flowing through the several flow passages 53 are controlled by the spacing of the passages around the cone bottom or by vertical baffles placed in the annular conduit 57.

Figure 6:
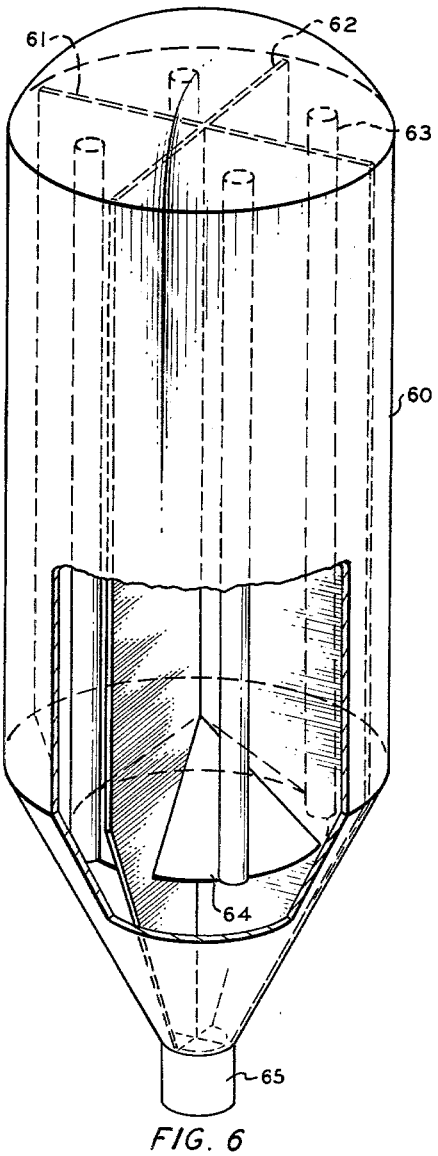
FIGURE 6 illustrates a blender wherein the internal section is compartmentalized.

FIGURES 6 and 7 illustrate an arrangement similar to FIGURE 1 except where additional baffles 61 and 62 of FIGURE 6 have been added to divide the tank into a plurality of compartments. As illustrated, tank 60 is divided into four compartments. The tubes or conduits 63 are attached to the edge of conical baffle 64 and baffle members 61 and 62 extend below the area of the cone baffle and serve to divide exit 65 into multiple outlets which can be of varying cross-sectional area. The arrangement not only serves to achieve mixing of the contents of each compartment but in addition serves to regulate the ratio of the flow of particles from the various compartments out of tank 60 at outlet 65.

FIGURE 7 represents an embodiment of the invention wherein tank 70 is provided with a conical baffle 71 in the lower end thereof. Conduit or tube 72 is mounted on the apex of the baffle. Four slots 73 are provided along the axis of conduit 72. Baffle members 74, 75, 76 and 77 are provided to divide the interior of the tank into compartments. While four compartments are illustrated, two or more compartments may be utilized if desired. Conduit 72 serves as a receiving system by introducing the particles to be blended into the conduit through opening 78. Particles enter this section and are discharged into each of the compartments through nearly continuous slots 73 between the receiving section or tube 72 and each of the compartments. In this way the particle level will be the same in each of the compartments and yet there will be no transfer of particles from one compartment to the other. Slots 73 can be interrupted sufficiently to brace the divider between compartments. This arrangement makes it possible to achieve full blending efficiency even with the tank half full. This also allows the tank to operate as a blender when it is receiving and discharging material at the same time, with or without recirculation of blender contents. The particles on passing through slots 73 are then removed through outlet 79. The particles can be recirculated or otherwise subsequently treated as desired.

In FIGURE 8 a system is provided for smoothing out any rapid changes in the properties of material being produced wherein a complete solids blending system is not desired. Tank 80 is divided into vertical sections by means of baffles 81, 82, 83 and 84. Each section is filled in sequence by providing openings such as 85 and 86 in each of the baffles located in progressively descending levels from the top of the tank 80. Thus one section is filled before any material is added to the others. Particles are added through inlet 87. When the tank is filled, material is withdrawn from the bottom of the tank through the outlet at the bottom of cone 89 so that equal amounts of particles are withdrawn from each section. Thus any material produced at a certain time is diluted with other material in the same proportion as the number of sections in the tank. In a circular tank such as 80, uniform withdrawal and maximum dilution of the material can be attained by the use of vertical tank baffles in the bottom part of the cone bottom 89.

If several tanks such as tank 80 are used in series, additional blending is obtained each time the material is withdrawn from a tank. Cone 95 is provided in each compartment to avoid stagnation. In addition, the relative position of the vertical dividers can be varied so as to alter the ratio of the flow from the various compartments.

FIGURE 9 illustrates additional baffling members which can be employed internally in the conduits or tubes of the various blenders heretofore illustrated. Rather than an external baffle such as disclosed attached to the drain tubes of FIGURE 4, baffling means 91 consisting of a plate fastened across the notch formed in tube 92 can be employed. By varying the cross-sectional area of the various flow-restricting openings in and within conduit 92, a variation of quantities of particles from each source feeding into tube 92 is possible.

As shown in FIGURE 10, two or more tubes can be utilized for each upright drain tube. The upper holes are in tube 101 and the lower holes are in tube 102. Both tubes have common outlet 103 which allows passage of the particles from the bed into the blender discharge. When the particle level falls below the lower hole in one tube, the holes in the other tube serve to divide the flow among them. While, preferably, the tubes 101 and 102 are shown to have common outlet means 103, the tubes also can be separate at their outlets.

As shown in FIGURE 11, zone 79 of the blender of FIGURE 7 is divided into unequal areas by the lower extension of baffles 74, 75, 76 and 77. In this manner the rate of flow through the various compartments of the blender is regulated or altered as desired by varying the respective areas shown by altering the relative positions of the various baffles.

While the invention has been described in relation to certain specific embodiments of the presently preferred form, the invention is not limited to the specific embodiments illustrated. The various openings and passageways need not be circular in cross section. The invention, moreover, is not limited to the specific number of spacings or openings as illustrated. Likewise the number of conduits or tubes inserted into the blender tank can be varied as desired. In addition, other conveyor means such as a bucket lift or auger can be substituted for the recycling means illustrated in FIGURE 1. Such recycling means can also be adapted to the various blending tanks illustrated where more than one pass through the blender is required. Likewise is contemplated within the scope of the invention the use of a plurality of such blenders as illustrated in combination which will result in a blending identical to that achieved wherein a conveyor system is employed on a single tank for recycle of the particles being removed therefrom. The conveyor, regardless of type, can be positioned outside or inside the tank. Where only one pass through the various blender tanks is required, the particles can be removed directly from the outlet and passed on for subsequent use or storage.

Various modifications of this invention can be made, or followed, in view of the foregoing disclosure, without departing from the spirit or scope thereof.

I claim:

1. Solids blending apparatus comprising, in combination:
    (a) a chamber having an inlet and outlet at substantially opposite ends thereof;
    (b) a downwardly concave conical baffling means in a lower part of said chamber and spaced from the bottom of said chamber so as to provide a first passageway for said solids around said baffle;
    (c) a plurality of upright conduits positioned within said chamber to provide second passageways around said baffling means; and
    (d) at least one opening in each of said conduits at a level above said conical baffling means.

2. Solids blending apparatus comprising, in combination:
    (a) an upright cylindrical tank having a conical bottom, an outlet in said bottom, and top closure means having an inlet therein;
    (b) conical baffling means positioned in a lower part of said tank, being spaced above the bottom of said tank and generally in reverse to the shape of said bottom, thus forming an obstruction to flow through said outlet;
    (c) a plurality of upright conduits extending upwardly within said tank so positioned as to form a passageway around said conical baffling means; and
    (d) openings in the side wall of each such upright conduit at different elevations therein.

3. Apparatus according to claim 2 wherein said conical baffling means comprises a first downwardly concave baffle positioned essentially in the axis of said tank and a second conical-shaped ring baffle having attached thereto a plurality of said upright conduits.

4. The apparatus of claim 3 wherein said plurality of upright conduits is attached to the apex of said ring baffle in a manner so as to allow particles to flow through said baffle.

5. The apparatus of claim 2 wherein means is provided to return to the upper portion of said tank solids removed from the outlet thereof.

6. The apparatus of claim 2 wherein said conical baffling means has associated therewith along its outer periphery a plurality of said upright conduits and wherein said conduits have associated with the lower ends thereof additional baffle means which are so provided as to form channels for the solids passing therethrough in a manner so as to control the ratio of particles passing around said baffle to particles passing through said upright conduits.

7. Solids blending apparatus comprising, in combination:
    (a) an upright cylindrical tank having a conical bottom, an outlet in said bottom, and top closure means having an inlet therein;
    (b) at least one floor member positioned below said bottom and conforming generally to the shape thereof, thus forming at least one chamber below bottom of said tank;
    (c) a plurality of upright conduits within said tank attached to said floor member at the outer periphery thereof forming passageways to said chamber;
    (d) at least one opening in the side wall of each such upright conduit at an elevation above the level of said floor member; and
    (e) baffling means associated with said upright conduits and positioned within said chamber so as to form additional passageways to said outlet.

8. The solids blending apparatus of claim 6 wherein additional baffling means is provided within said upright cylindrical tank, said baffling means being so positioned as to traverse said cylindrical tank and thereby divide same into at least two separate compartments, said compartments being so adapted as to allow removal therefrom of the solids through a single outlet in the bottom of said tank while at the same time allowing the ratio of the flow from each of said compartments through said outlet to be varied.

9. The apparatus of claim 2 wherein said upright conduits have baffling means in association with at least one opening therein, said baffling means being positioned in the annulus area formed by said upright conduit.

10. The apparatus of claim 2 wherein said upright conduits have baffling means in association with at least one opening therein, said baffling means being positioned adjacent said opening and on the outer surface thereof.

11. Solids blending apparatus comprising, in combination:
    (a) an upright cylindrical tank having a conical bottom, an outlet in said bottom, and top closure means having an inlet therein;
    (b) conical baffling means positioned in a lower part of said tank and in reverse to the shape of said bottom, thus forming an obstruction to flow through said outlet;
    (c) an upright conduit attached to the apex of said conical baffling means and extending upwardly to the inlet of said cylindrical tank;
    (d) baffling means traversing said cylindrical tank so as to divide same into at least two compartments; and
    (e) a continuous opening in the side wall of said upright conduit in each of the compartments formed by said baffling means traversing said cylindrical tank and which extends substantially from said conical baffling means to the inlet in said tank.

12. Solids blending apparatus comprising, in combination:
    (a) an upright cylindrical tank having a conical bottom, an outlet in said bottom, and top closure means having an off-center inlet therein;
    (b) baffling means traversing said cylindrical tank so as to divide same into at least two compartments;
    (c) openings positioned in each of said baffling means traversing said cylindrical tank at the uppermost end thereof which are in such a relationship as to allow filling of one compartment formed by said traversing baffling means prior to introduction of solids to a subsequent compartment; and
    (d) outlet means capable of adjusting the flow from each of the compartments formed by said baffling means traversing said cylindrical tank and positioned in the outlet of said conical bottom.

13. Solids blending apparatus according to claim 12 wherein a conical baffling means is positioned in association with each of said baffling means traversing said cylindrical tank and at a point therein.

14. Solids blending appartus comprising, in combination:
(a) an upright cylindrical tank having a conical bottom, an outlet in said bottom and top closure means having an inlet therein;
(b) conical baffling means positioned in a lower part of said tank, being spaced above the bottom of said tank and generally in reverse to the shape of said bottom, thus forming an obstruction to flow through said outlet;
(c) a plurality of upright conduits extending upwardly within said tank so positioned as to form a passageway around said conical baffling means and extending through said conical bottom;
(d) a plurality of conduits in operative association with said upright conduits and said outlet; and
(e) openings in the side wall of each such upright conduit at different elevations therein.

References Cited by the Examiner

UNITED STATES PATENTS

| | | | |
|---|---|---|---|
| 2,455,572 | 12/48 | Evans | 259—180 |
| 2,805,802 | 9/57 | Strong. | |
| 2,994,460 | 8/61 | Matthews | 259—180 X |
| 3,029,986 | 4/62 | Horn et al. | |
| 3,094,243 | 6/63 | Haugen. | |
| 3,106,385 | 10/63 | Arthur et al. | 259—180 |

FOREIGN PATENTS 521,025   5/40   Great Britain.

RAPHAEL M. LUPO, *Primary Examiner.*

CHARLES A. WILLIMUTH, LOUIS J. DEMBO,
*Examiners.*